United States Patent Office 2,695,242
Patented Nov. 23, 1954

2,695,242

MAGNESIA-CONTAINING MATERIAL

Teynham Woodward, Los Altos, Calif., assignor to The Kaiser Aluminum & Chemical Corporation, Oakland, Calif., a corporation of Delaware No Drawing. Continuation of application Serial No. 557,047, October 3, 1944. This application June 15, 1951, Serial No. 231,899

6 Claims. (Cl. 106—57)

This invention concerns the production of formed shapes containing hydrated magnesia which are especially suitable for the production of magnesia-containing refractories such as periclase, forsterite and the like, or of magnesia refractories having heterogeneous bonding material, and it concerns the production of hard, non-dusting products containing hydrated magnesia.

In the burning of magnesia to the characteristic physical form of periclase it is especially advantageous to use as starting material a hard, dense, non-dusting shape or grain in order to produce periclase of high density. Not only is this desirable in the manufacture of periclase grains themselves, but it is also desirable in making magnesia containing refractories, which may consist of periclase grains bonded together with a bonding agent such as spinel or forsterite or which may consist of a material such as forsterite. It is understood that, in general, a better refractory exhibits a higher density and a stronger bonding effect within itself, which may be of the nature of an ionic bond. Besides refractory materials, it is desirable in other processes as well to prepare pellets or the like, containing magnesia, which are hard and non-dusting and the products made as herein described are useful in a number of ways.

Various ways and means intended to increase the density in the manufacture of a refractory material or to increase the strength of its internal bonding effects have, therefore, been known to the art. For instance, it has been proposed to reduce the voids in a refractory raw material such as magnesia as by milling, in order to reduce the porosity and improve the refractory formed therefrom. However, while the density is increased in this manner, it is not to be expected that the strength of the internal bond would be affected in such a process.

According to this invention, formed shapes or agglomerates containing magnesia and, if desired, additional ingredients as more fully explained elsewhere, and which are especially suitable for the manufacture of magnesia refractories, are prepared by suitably calcining hydrated magnesia, forming the calcined product into shapes, and hydrating.

A suitable starting material in this process is magnesium hydroxide which has been produced from seawater, for example, by treating seawater with calcined dolomite and recovering the so-precipitated magnesium hydroxide by any desired method, as by filtration. However, hydrated magnesia from any other source may be used. It is preferable to start with a highly purified magnesia.

The magnesium hydroxide, or hydrated magnesia, starting material is calcined to the required degree prior to forming into shapes or agglomerates with addition of water, as by pelleting, briquetting, extruding or the like. The material is calcined to the proper activity, that is, to the degree that it is sufficiently reactive to hydrate in the formed state with evolution of heat and development of strength and hardness but is sufficiently non-reactive so that it does not substantially hydrate, or "set up," during the forming step, but that there is a sleeping period during which the material is shaped and after which the characteristic hydration step takes place. Calcination of the starting material especially when it is formed by extrusion, is suitably effected to what is called a medium burn, or to an ignition loss of from about 0.5% to about 2.5%. That is, especially when formation is by extrusion as described below, a magnesia which has been calcined to an iodine number of from about 5 to about 25 can be treated according to the process of this invention to give a dense product. Preferably, under these circumstances, the iodine number is from about 10 to about 20. However, with other methods of formation somewhat different ranges of activity are effective. For instance, where less water is used in mixing and/or the time required for forming is less, a more active material may be used and conversely, where more water is used and/or a slower method of formation is employed, a less reactive magnesia is useful.

The activity of the magnesia, as indicated above, is conveniently measured by determining the absorption of iodine by the particles, or the iodine number. The iodine number as herein referred to is determined by treating 100 ml. of an N/20 solution of iodine in carbon tetrachloride with four grams of powdered magnesium oxide for a period of fifteen minutes, allowing the magnesia to settle, removing a sample of the liquid, and determining the residual iodine in solution. The amount of iodine removed from solution expressed in milli-equivalents per 100 gms. of MgO is the iodine number.

The calcined magnesia of the desired activity, with or without additional ingredients, is formed, and allowed to stand until hydrated and hardened, during which stage considerable heat of hydration is developed. The shaped product so obtained is very hard and dense. It is not understood exactly what causes the significant changes in properties where proceeding according to the method of this invention, but an excellent bonding effect is obtained between the magnesia particles in the final hydrated product. A hydrated magnesia shape prepared according to this invention without added ingredients has a greatly increased density and has the characteristics of a synthetic brucite. The product can be burned to periclase, to a higher density. The product is also useful as formed in a number of industrial applications, for instance as a neutralizing agent.

It is an advantage, as will be more fully explained later, that the formed shape can be burned to periclase, or to a refractory product, in a stack kiln. This is desirable in that significant economies in fuel consumption can thereby be effected, rotary kilns being notoriously wasteful of fuel at high temperatures. The shapes obtained are so strong that they can be fed into a stack kiln without substantial breakage or dusting. The periclase obtained is very dense. It is another advantage that shapes so prepared of admixtures of magnesia with, for example, alumina, while excessively refractory for burning in a rotary kiln, are suitable for processing to spinel in a stack kiln.

In the process of this invention the starting material, which may be magnesia, or magnesia admixed with silica, alumina, titania, zirconia or other refractory-producing material, is shaped with the addition of water, preferably under pressure as by extrusion through a die and cut to form pellets of desired length, and allowed to harden. The hardening effect is accompanied by considerable evolution of heat, developed by the hydrating reaction, and, if desired, the shapes can be cooled during the hydrating step. This can be conveniently done by spreading them on screens in the air.

The magnesia-containing mass can be formed into shapes, grains or the like in any desired manner as by briquetting, pelleting, nodulizing or the like. When pelleting or briquetting, for example, by extruding as described or by forming in pelleting or briquetting rolls, the mass can usually be formed with a lower proportion of water. Enough water is added in pelleting or extruding, for instance, to give a mass which is of about the consistency of a stiff putty. (The formed material is somewhat soft. It becomes hardened and very strong when hydration takes place.) This requires usually from about 15% to about 25% by weight of water. In nodulizing, the mass is tumbled in a nodulizer with a spray of water or of water solution containing an ingredient which it may be desired to add to the mass. When it is desired to add a water soluble or water-miscible substance to the mass it is frequently convenient to add the water and such ingredient together, as in the form of a solution or mixture. It is preferred in this process to use as little water as possible. Only enough water is added to give a mass which will be cohesive and which can be formed, according to the method of shaping employed. By using a minimum amount of water and working with a mix which is as stiff as possible, higher pressures can be obtained in an extrusion die, for example, and it is found that a harder final hydrated pellet results. The hydrated pellet so formed exhibits a relatively monolithic structure.

As an example of the process of this invention, magnesium hydroxide which has been obtained from seawater by reaction thereof with calcined dolomite to obtain a sludge of precipitated magnesium hydroxide, the sludge then being washed and filtered, is calcined to an iodine number of about 15. The calcined magnesia is ground to break up aggregates formed in calcining and is thereby mixed with 3% by weight of an amorphous, finely divided silica obtained as a dust precipitated from the vapors issuing from a reaction zone wherein iron, carbon, and crystalline silica are reacted to give as a principal product the alloy of ferrosilicon. To the mixture of magnesia and silica is added about 18% by weight of water and then thoroughly mixed. The mass is formed into pellets by extruding through dies under pressure, and cutting the extruded material into about one inch lengths. The pellets are now allowed to hydrate thereby becoming very hard and developing a great amount of heat.

The hardened pellets are fed into a stack kiln with coke fuel in the proportion of about 300 lbs. of coke to about a ton of pellets. The pellet-coke feed is heated as it passes down through the kiln by the gases of combustion rising from the burning zone, the feed passes through the burning zone where the coke is consumed and the pellets burned to periclase with a forsterite bond formed by combination of some of the magnesia and the silica. The periclase pellets pass on down through the stack, pre-heating the incoming air which goes up through the pellet bed to the burning zone. The pellets withdrawn from the bottom of the stack may be used as such or may be crushed to form refractory grains for incorporation in other desired compositions or mixes such as ramming mixes, etc. The bulk density of the hydrated product described is on the average of about 62 lbs. per cu. ft. and when calcined to periclase, with the addition of about 3% of volatilized silica as described, the product weighs on the average about 100 lbs. per cu. ft.

Magnesia can be calcined as described and admixed with the desired additives; or the additives can be admixed with washed magnesium hydroxide sludge, thereby obtaining increased efficiency of interdispersion, the sludge filtered, if necessary, and calcined to obtain magnesia of the desired activity and containing the desired additives.

The silica which is added in the above example may be substituted by a ground silica from any other source. It is highly desirable that the ingredients be reduced to a fine subdivision, and when prepared as described above they will pass through a 325 mesh screen to the extent of 90 to 95%, after the aggregates formed in calcining etc. have been disintegrated, usually by grinding.

In place of silica, other suitable oxides, particularly alumina, titania or zirconia or mixtures thereof can be admixed with the properly calcined magnesia. Each of these oxides will give a characteristic bonding material when admixed in small proportions with the magnesia. When added to the magnesia in larger proportions, well-known to the art, characteristic compositions such as forsterite, spinel and the like are formed. These compositions or compounds are characterized by increased density and great internal bonding strength when made according to the process of this invention. In still another example of the method of this process, the calcined magnesia is admixed with a low-iron serpentine, which can be prepared by removing the iron constituent on a concentrating table or which may be a naturally occurring low-iron serpentine, the mixture processed as described above, and burned to give a periclase refractory bonded with forsterite. Of course, where a very pure, highly refractory magnesia is desired to be made it is not necessary to add any bonding agent.

It is an advantage of this invention that highly pure or homogeneous refractory materials can be prepared in this manner. Thus, when starting with properly calcined magnesia recovered from seawater sludge and a small proportion of an amorphous silica recovered from the vapors resulting from the reaction of iron, carbon, and silica, the formed shapes prepared according to this invention can be burned in a stack kiln to convert the magnesia therein to periclase, the silica simultaneously combining with a small proportion of the magnesia to form a forsterite bonding material. It is advantageous to make refractories as described by starting with strong dense shapes which can be treated in a stack kiln and will withstand the conditions of handling incident thereto, as much higher temperatures, greater fuel economy and a better refractory can be thus obtained. By being enabled to attain higher temperatures in burning, more heat-resistant starting materials can be used, for example alumina can be a constituent of the starting mix and a spinel-bonded magnesia refractory obtained thereby. Furthermore, the presence of agents, such as lime, which are ordinarily believed to favor the formation of periclase from magnesia is not required when higher temperatures are available for burning. This also is advantageous as the presence of lime compounds is quite undesirable in many refractory materials because it tends to lower the hot-load strength thereof, as in refractories containing silica wherein the lime reacts to form calcium silicate or metasilicate.

It is a further advantage of the process of this invention over any of the known processes for making magnesia-containing shapes to be burned to refractory material that the starting material is also purified by calcining. In the calcining operation the chlorides are substantially driven off, as well as other volatile impurities which may be present, so that a very pure magnesia starting material is available for the formation of the hydrated product. In fact, in the example shown above the total amount of impurities in the magnesia employed is less than 3%.

A hardened pellet can also be made by this process, which comprises a mixture of magnesia and carbon, the pellet being hard and non-dusting and suitable for a number of uses, such as conversion of the magnesia therein to magnesium chloride in a chlorinating tower, production of metallic magnesium by heating to bring about a reduction reaction between the carbon and the magnesia, etc.

In the specification and appended claims the term "hydrated magnesia" is intended to include magnesium hydroxide and magnesia containing water of hydration.

It is to be understood that the above specific description and examples have been given for purposes of illustration only and that modifications and variations can be made therein without departing from the spirit and scope of the appended claims.

This application is a continuation of my application, Serial No. 557,047, filed October 3, 1944, now abandoned.

What is claimed is:

1. Process for producing dense high purity periclase refractory agglomerates which consists in calcining an entire amount of hydrated magnesia to form magnesia of medium burn, admixing water and said calcined magnesia, said water being added in an amount to provide a cohesive mass which can be formed and to at least partially hydrate said magnesia, forming agglomerates of said admixture, allowing said formed agglomerates to stand until hydrated and hardened, and firing said agglomerates to convert the magnesia to periclase.

2. Process for making dense, high-purity periclase refractory agglomerates which consists in calcining an entire amount of precipitated magnesium hydroxide which has been obtained by reacting seawater with calcined dolomite and washing and filtering the precipitate, to form medium burn magnesia, admixing said calcined magnesia with about 15% to 25% water, forming agglomerates of said admixture under pressure, allowing said agglomerates to stand until hydrated and hardened, and firing said hardened agglomerates to convert said magnesia to periclase.

3. Process as in claim 2 wherein said agglomerates are fired in a stack kiln.

4. Process for producing dense, high-purity periclase refractory pellets which consists in calcining an entire amount of magnesium hydroxide which as been obtained by reacting seawater with calcined dolomite and washing and filtering the precipitated magnesium hydroxide, to form medium burn magnesia, admixing said calcined magnesia with about 15% to 25% of water, pelleting said admixture under pressure, allowing said pellets to stand until hydrated and hardened, and firing said hardened pellets in a stack kiln to convert the magnesia to periclase.

5. Process for making dense periclase refractory pellets which consist in calcining an entire amount of hydrated magnesia to form magnesia of medium burn, admixing therewith to form a bonding material a small proportion of a substance chosen from the group consisting of silica, alumina, zirconia and titania, admixing water with said admixture, in an amount to provide a cohesive mass which can be formed and to at least partially hydrate said magnesia, pelleting the water-containing mixture under pressure, allowing the pellets to hydrate and harden, and burning said hardened pellets to convert magnesia therein to periclase.

6. Process as in claim 5, wherein there is admixed with said calcined magnesia 3% by weight of finely divided amorphous silica deposited from the vapors issuing from a reaction zone wherein ferrosilicon is being produced.

References Cited in the file of this patent

UNITED STATES PATENTS

| Number | Name | Date |
|---|---|---|
| 1,307,197 | Hanson et al. | July 17, 1919 |
| 2,206,131 | Seil | July 2, 1940 |
| 2,219,725 | Seaton | Oct. 29, 1940 |
| 2,219,726 | Seaton | Oct. 29, 1940 |
| 2,234,367 | Chesny | Mar. 11, 1941 |
| 2,348,847 | Pike | May 16, 1944 |
| 2,478,593 | Pike | Aug. 9, 1949 |

FOREIGN PATENTS

| Number | Country | Date |
|---|---|---|
| 106,485 | Austria | 1927 |
| 827,788 | France | 1938 |